(12) United States Patent
Krishnan et al.

(10) Patent No.: US 10,968,793 B1
(45) Date of Patent: Apr. 6, 2021

(54) AXLE ASSEMBLY

(71) Applicant: Dana Automotive Systems Group, LLC, Maumee, OH (US)

(72) Inventors: Sajeev C. Krishnan, Perrysburg, OH (US); Brian S. Longardner, Sylvania, OH (US); Nicholas C. Billmaier, Bowling Green, OH (US); Thomas L. Nahrwold, Napoleon, OH (US); Astha Barve, Pune (IN); Robin Dominiak, Albi (FR)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/662,678

(22) Filed: Oct. 24, 2019

(51) Int. Cl.
| | |
|---|---|
| *F16H 57/04* | (2010.01) |
| *F01M 11/00* | (2006.01) |
| *F01M 9/12* | (2006.01) |
| *B60K 17/346* | (2006.01) |
| *B60B 35/16* | (2006.01) |

(52) U.S. Cl.
CPC ......... *F01M 11/0004* (2013.01); *B60B 35/16* (2013.01); *B60K 17/346* (2013.01); *F01M 9/12* (2013.01)

(58) Field of Classification Search
CPC ............... F16H 57/042; F16H 57/0426; F16H 57/0424; F16H 57/0423; F16H 57/0427; F16H 57/0428; F16H 57/0457; F16H 57/037; F16H 2057/02052; F01M 9/12; F01M 9/06; F01M 11/0004; B60K 17/346
See application file for complete search history.

(56) References Cited

U.S. PATENT DOCUMENTS

| | | | | |
|---|---|---|---|---|
| 5,911,291 A | * | 6/1999 | Suetake | ................ F16D 27/115 192/35 |
| 6,012,560 A | * | 1/2000 | Kuroda | .................. B60K 17/35 192/35 |
| 6,041,904 A | * | 3/2000 | Kuroda | .................. B60K 17/35 192/113.34 |

(Continued)

FOREIGN PATENT DOCUMENTS

| | | | |
|---|---|---|---|
| DE | 102010017864 A1 * | 10/2011 | ......... F16H 57/0427 |
| DE | 102017103995 A1 * | 9/2017 | ......... F16H 57/0426 |

(Continued)

OTHER PUBLICATIONS

Machine Traslation of DE 10 2017 103 995, obtained Jul. 29, 2020.*

(Continued)

*Primary Examiner* — Richard W Ridley
*Assistant Examiner* — Brian J McGovern
(74) *Attorney, Agent, or Firm* — McCoy Russell LLP

(57) ABSTRACT

An axle assembly including a disconnect assembly and an integrated fluid flow system. The disconnect assembly including an axially movable clutch member in selective engagement with at least one shaft to permit a rotation thereof. The fluid flow system includes a fluid flow member and a plurality of fluid passageways to permit a flow of a fluid (e.g. a lubricant) from a fluid source (e.g. a fluid sump of the axle assembly) to various components disposed within a carrier housing of the axle assembly and a return of the fluid back to the fluid source.

20 Claims, 9 Drawing Sheets

(56) References Cited

U.S. PATENT DOCUMENTS

| | | | | | |
|---|---|---|---|---|---|
| 6,070,495 | A | * | 6/2000 | Kuroda | B60K 17/35 |
| | | | | | 180/197 |
| 6,095,276 | A | * | 8/2000 | Kuroda | B60K 17/35 |
| | | | | | 180/247 |
| 6,105,703 | A | * | 8/2000 | Kuroda | B60K 17/35 |
| | | | | | 180/248 |
| 2013/0274055 | A1 | * | 10/2013 | Horaguchi | F16H 48/05 |
| | | | | | 475/221 |
| 2014/0231209 | A1 | * | 8/2014 | Nett | F16H 57/0483 |
| | | | | | 192/85.01 |
| 2015/0192198 | A1 | * | 7/2015 | Suzuki | F16H 57/0473 |
| | | | | | 180/233 |
| 2016/0377168 | A1 | * | 12/2016 | Nahrwold | F16H 57/037 |
| | | | | | 475/160 |

FOREIGN PATENT DOCUMENTS

| | | | | |
|---|---|---|---|---|
| WO | WO-2016089764 A1 | * | 6/2016 | F16H 57/0427 |
| WO | WO-2017162242 A1 | * | 9/2017 | F16H 57/0482 |

OTHER PUBLICATIONS

Machine Translation of WO 2017/162242, obtained Jul. 29, 2020.*
Machine Translation of DE 10 2010 017 864, obrained Jul. 29, 2020.*

* cited by examiner

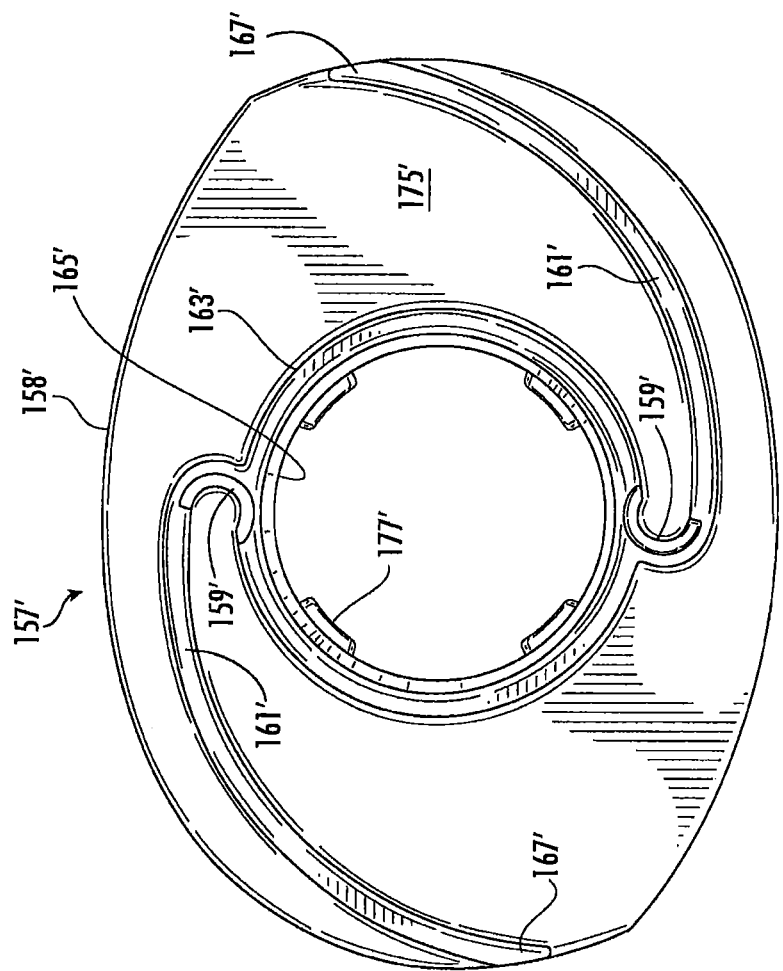
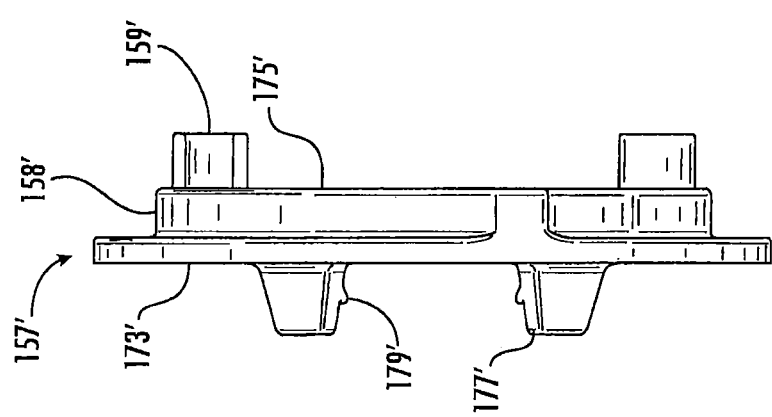
FIG. 4B
FIG. 4A

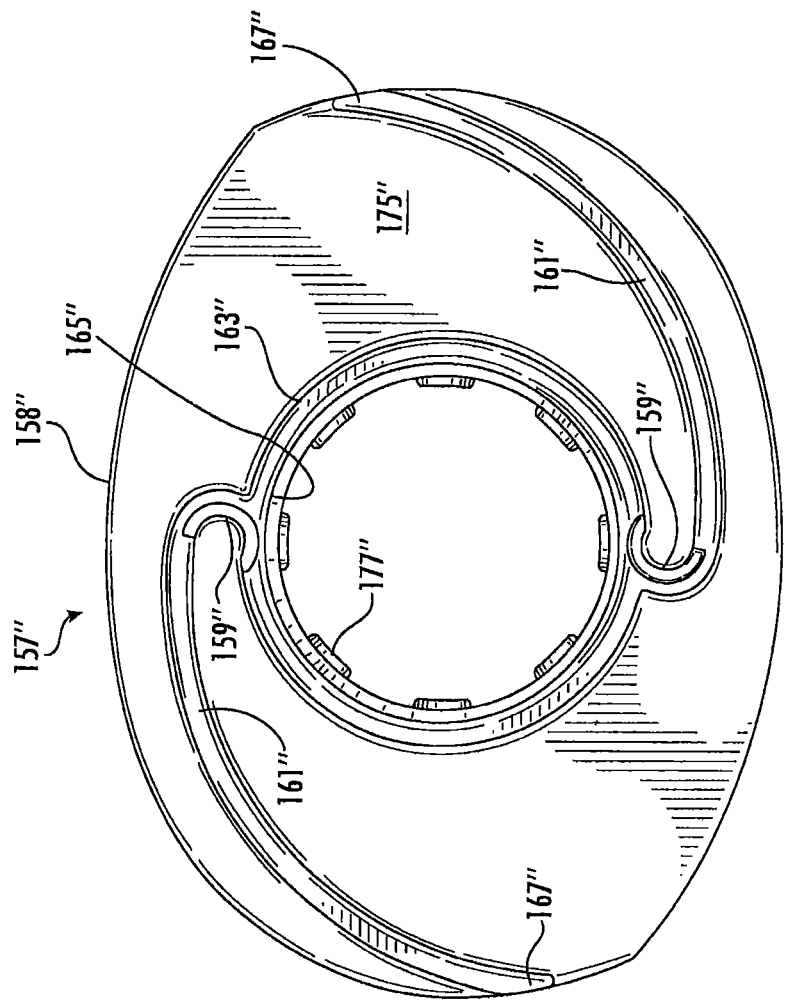
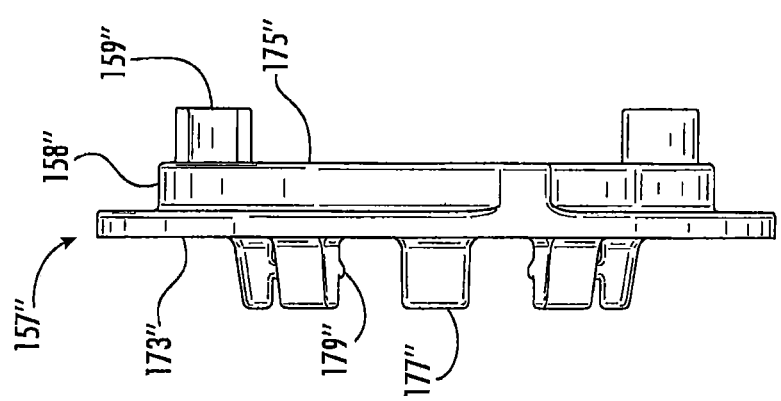
FIG. 5B
FIG. 5A

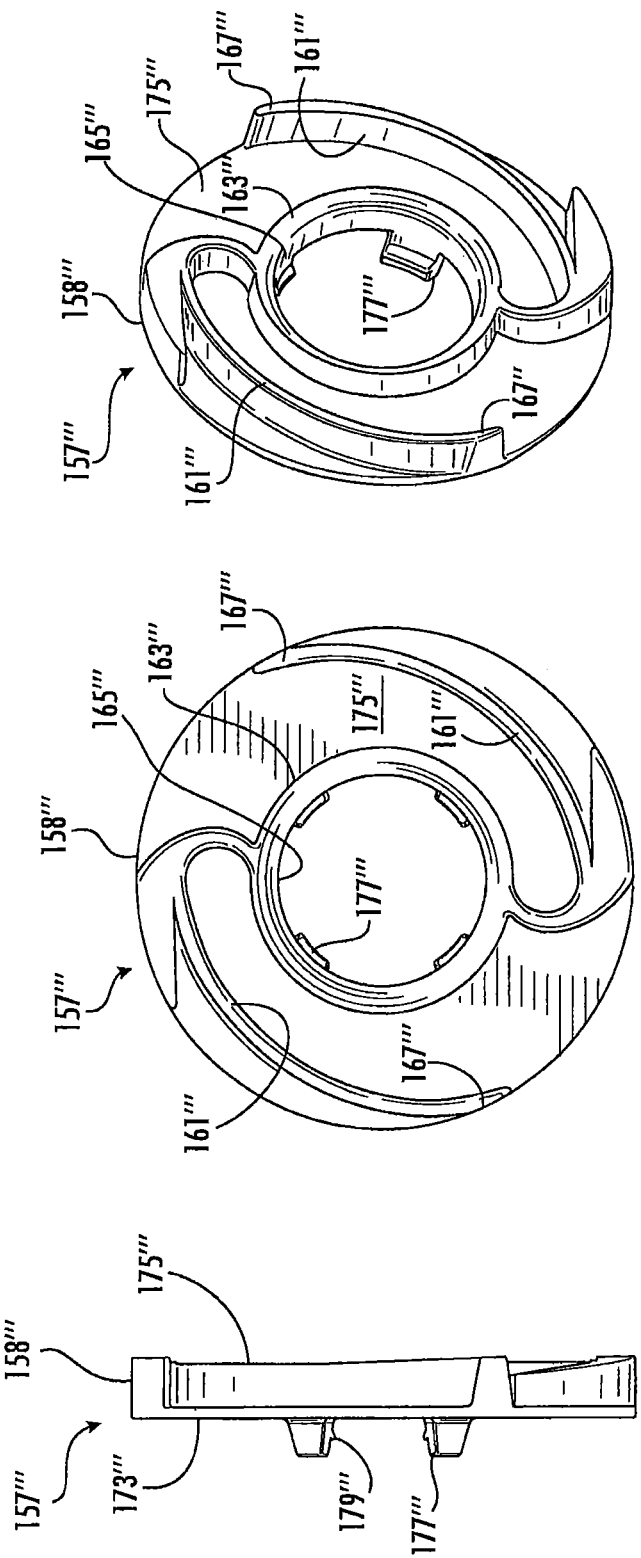

AXLE ASSEMBLY

FIELD

The presently disclosed subject matter relates to a vehicle, and more particularly to an axle assembly for the vehicle including a disconnect assembly an integrated fluid flow system.

BACKGROUND

Electric drive axles are known of the type which comprises an electric motor, a gear assembly, and an axle assembly. The axle assembly typically includes a carrier housing for storing an amount of lubricating oil therein, a differential rotatably mounted within the carrier housing, a ring gear contained within the carrier housing and mounted on the differential for rotation therewith, and a pair of axle half shafts which extend outwardly to respective wheel ends (i.e. a wheel set). In an all-wheel drive ("AWD") vehicle, a primary wheel-set may be continually connected to a power source of the AWD vehicle while a secondary wheel-set is selectively connected thereto via a disconnect assembly. The disconnect assembly may include a clutch mechanism to selectively disconnect components of the secondary wheel-set and associated driveline, thereby improving a fuel efficiency of the AWD vehicle.

In such axle assemblies as described above, components such as bearing for rotatably supporting the differential within the carrier housing are typically positioned facing an interior of the carrier housing and directly splashed with lubricating oil picked up by rotation of the ring gear. However, other components (i.e. the disconnect assembly) disposed within the axle assembly, and more particularly the carrier housing, may not be splashed with the lubricating oil splashed by the ring gear. It is, therefore, necessary to provide positive lubrication of the other components disposed within the carrier housing so as to ensure durability of the axle assembly.

Conventionally, there have been lubrication systems, wherein an oil supply passage is formed in an upper portion of the carrier housing to receive the lubricating oil picked up by rotation of the ring gear and supply it into an annular space around a drive pinion shaft, and an oil return passage is formed in the bottom portion of the carrier housing to permit the lubricating oil passing through around the drive pinion shaft to return into an interior of the carrier housing. In such arrangements, it is still difficult to supply a sufficient and consistent amount of lubricating oil since the oil supply passage receives the lubricating oil splashed from the ring gear and not a controlled amount.

It would be desirable to produce an axle assembly including a disconnect assembly and an integrated fluid flow system, which enhances durability, efficiency and manufacturability, while a cost and weight thereof is minimized.

SUMMARY

In concordance and agreement with the present disclosure, a disconnect assembly and an integrated fluid flow system, which enhances durability, efficiency and manufacturability, while a cost and weight thereof is minimized, has surprisingly been discovered.

In one embodiment, an axle assembly, comprises: a housing having a fluid sump provided with a fluid disposed therein; and a fluid flow member rotatably disposed in the housing, wherein the fluid flow member is configured to collect a portion of the fluid from the fluid sump and at least partially direct a flow of the fluid to at least one desired component disposed within the housing.

As aspects of certain embodiments, the fluid flow member is one of disc shaped, elliptical shaped, and irregular shaped.

As aspects of certain embodiments, the fluid flow member includes a main body having a first surface and an opposing second surface.

As aspects of certain embodiments, at least one of the first surface and the second surface of the main body is substantially planar.

As aspects of certain embodiments, the fluid flow member includes at least one retention feature formed on at least one of the first surface and the second surface of the main body.

As aspects of certain embodiments, the fluid flow member includes at least one surface feature formed on at least one of the first surface and the second surface of the main body.

As aspects of certain embodiments, the at least one surface feature is one of an arcuate shape and an involute shape.

As aspects of certain embodiments, the fluid flow member includes at least one catch formed on at least one of the first surface and the second surface of the main body.

As aspects of certain embodiments, the axle assembly further comprises at least one rotatable shaft at least partially disposed in the housing.

As aspects of certain embodiments, the fluid flow member is disposed about and rotatably coupled to the at least one rotatable shaft at least partially disposed in the housing.

As aspects of certain embodiments, the at least one desired component is a portion of a disconnect assembly.

As aspects of certain embodiments, the at least one desired component is a bearing interposed between a rotatable link shaft and an axle half shaft.

As aspects of certain embodiments, the fluid flow member forms part of a fluid flow system.

As aspects of certain embodiments, the fluid flow system further includes at least one fluid passageway formed in at least one of the housing and a rotatable shaft at least partially disposed in the housing.

In another embodiment, an axle assembly, comprises: a housing having a first axle shaft and a second axle shaft connected by a differential and a link shaft, wherein a bearing is interposed between the second axle shaft and the link shaft; and a disconnect assembly including a clutch member configured to selectively couple the second axle shaft and the link shaft.

In yet another embodiment, a method of lubrication for an axle assembly, comprising: providing a housing having fluid sump and a fluid flow member rotatably disposed in the housing; and causing a rotational movement of the fluid flow member to collect a portion of the fluid from the fluid sump and at least partially direct a flow of the fluid to at least one desired component disposed within the housing.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 4A is a side elevational view of the fluid flow member shown in FIG. 2 according to another embodiment of the presently disclosed subject matter;

FIG. 4B is a rear elevational view of the fluid flow member of FIG. 4A;

FIG. 5A is a side elevational view of the fluid flow member shown in FIG. 2 according to another embodiment of the presently disclosed subject matter;

FIG. 5B is a rear elevational view of the fluid flow member of FIG. 5A;

FIG. 6A is a side elevational view of the fluid flow member shown in FIG. 2 according to yet another embodiment of the presently disclosed subject matter;

FIG. 6B is a rear elevational view of the fluid flow member of FIG. 6A;

FIG. 6C is a rear perspective view the fluid flow member of FIGS. 6A-5B;

DETAILED DESCRIPTION

Figure 1:
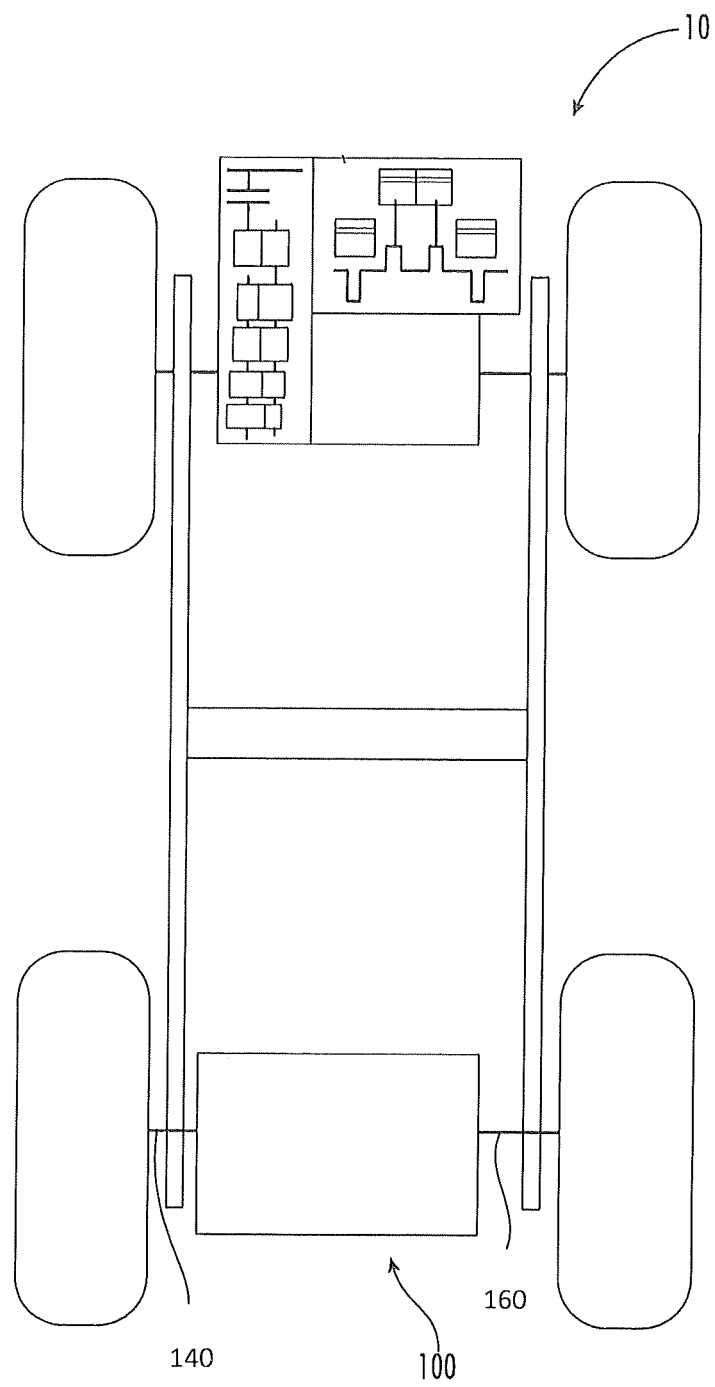
FIG. 1 schematically depicts a vehicle driveline including an axle assembly according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 illustrates an all-wheel-drive (AWD) vehicle 10 includes an axle assembly 100 according to the presently disclosed subject matter. Embodiments of the axle assembly 100 are described below. The axle assembly 100 may be utilized with an all-wheel drive vehicle, a pure electric vehicle and a hybrid four-wheel-drive (4WD) vehicle wherein at least one of the front axle and the rear axle includes the axle assembly 100. In still other embodiments, the axle assembly 100 may be utilized in a hybrid commercial vehicle (not depicted) comprising a tandem axle in which the front tandem axle is driven by an internal combustion engine, and the rear tandem axle includes the axle assembly 100 (or vice versa). The axle assembly 100 may have applications in commercial vehicles, both light duty and heavy duty vehicles, and for passenger, off-highway, and sport utility vehicles. Additionally, the axle assembly 100 described herein may be adapted for use in front and/or rear driving axles, and in steerable and non-steerable axles. It would be understood by one of ordinary skill in the art that the axle assembly 100 also may have industrial, locomotive, military, agricultural, and aerospace applications.

In certain embodiments, the axle assembly 100 may employed in an integrated drive system. The axle assembly 100 may include an electric motor-generator 101 coupled with a power source (not depicted). The electric motor-generator 101 may be a permanent magnet synchronous machine comprising a stator disposed concentrically about a rotor. The axle assembly 100 may additionally comprise an inverter (not depicted) for converting direct current to alternating current when the electric motor-generator 101 is utilized to drive the vehicle 10, and for converting alternating current to direct current when the vehicle 10 decelerates. Further, the axle assembly 100 may include cooling fluid (not depicted) such as, but not limited to, automatic transmission fluid or axle oil integrated with the axle assembly 100 for cooling the electric motor-generator 101 and the inverter. In another embodiment (not depicted), the cooling fluid for the electric motor-generator 101 and the inverter may not be integrated with the axle oil. The axle assembly 100 may also include a lubricating fluid (not depicted) such as, but not limited to, the axle oil, for example. The axle assembly 100 may have either a co-axial layout where an axle shaft connecting the wheel to a differential passes through a center of the electric motor-generator 101, or an off-axis layout where the axle shaft connecting the wheel to the differential does not pass through the center of the electric motor-generator 101 but rather parallel to an axis thereof.

Figure 2:
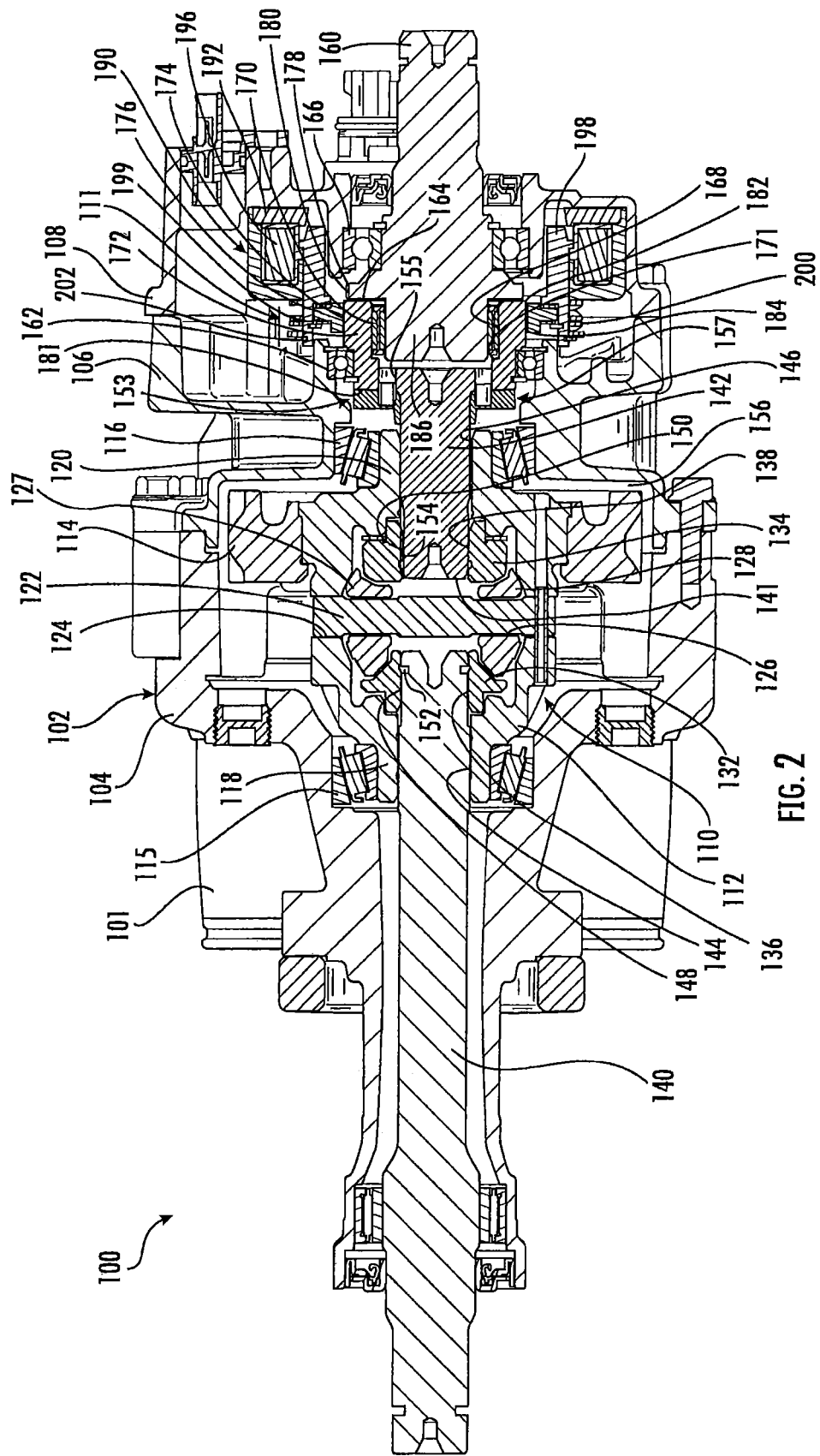
FIG. 2 is a cross-sectional view of a portion of the axle assembly shown in FIG. 1, wherein the portion of the axle assembly includes a differential and a disconnect assembly with a fluid flow member according to an embodiment of the presently disclosed subject matter.
Figure 5C:
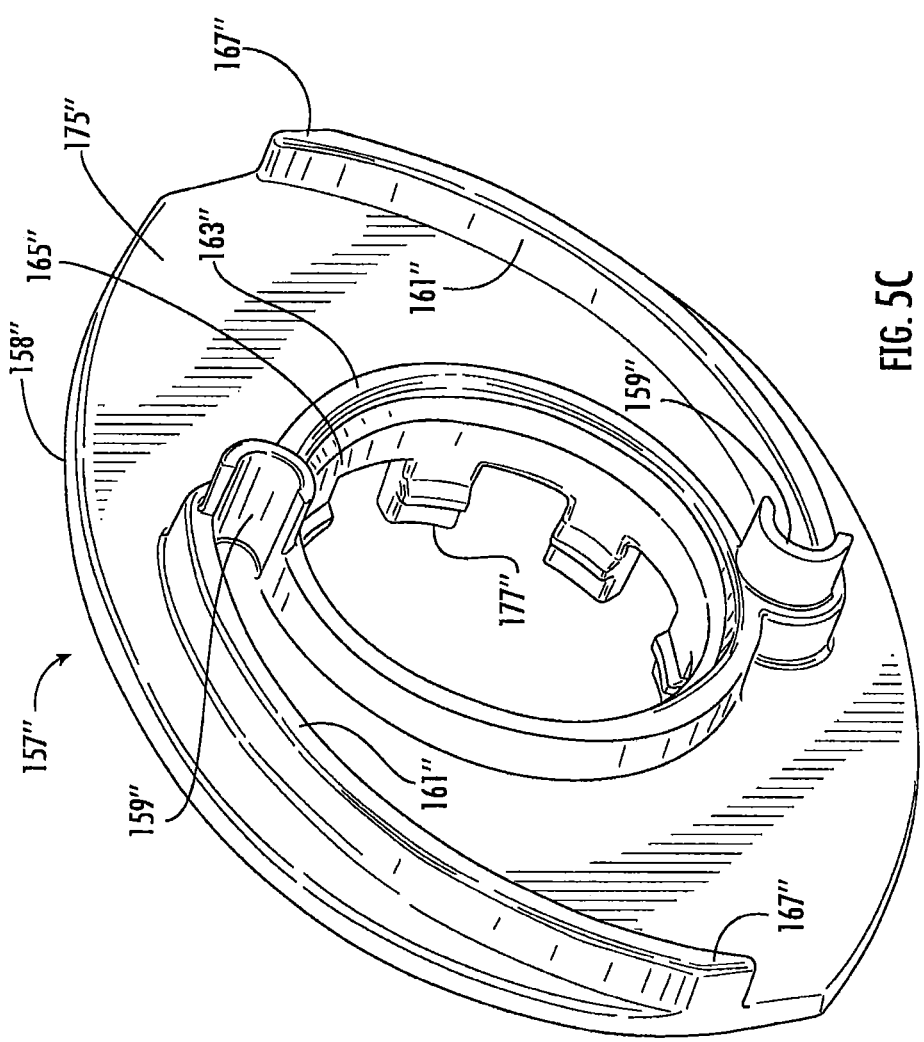
FIG. 5C is a rear perspective view the fluid flow member of FIGS. 5A-5B.

The axle assembly 100 depicted in FIG. 2 includes a carrier housing 102 having a first housing portion 104, a second housing portion 106 as described in more detail for FIGS. 5A-5C, and a third housing portion 108. It is understood, however, that the housing portions 104, 106, 108 may be integrally formed as a unitary structure if desired. In a non-limiting example, the carrier housing 102 may have a differential 110 and a disconnect assembly 111 disposed therein. Various types of differentials may be employed for the differential 110 as desired such as a split-case differential, a clamshell differential, a hub style differential, and the like, for example. It should also be appreciated that the differential 110 may formed from any suitable material using any suitable process as desired such as stamping or forming from a powered metal material, for example.

In certain embodiments, the differential 110 includes a differential case 112 mounted for rotation within the carrier housing 102. The electric motor-generator 101 may be drivingly coupled with a ring gear 114 of the differential 110 by at least one gear assembly (not depicted). The ring gear 114 may be formed on the differential case 112 by any suitable method as desired such as by welding, for example. It is understood that the ring gear 114 and the differential case 112 may be formed as an integral, unitary structure or as separate and distinct components if desired. In certain embodiments, the electric motor-generator 101 conveys torque to the differential 110 via the at least one gear assembly, and in turn to the differential case 112 via the ring gear 114. The ring gear 114 may be integrally formed with the differential case 112, or may be coupled with the differential case 112 via welding, mechanical fasteners, or other suitable methods as desired.

The differential case 112 may be mounted for rotation within the carrier housing 102 via a pair of bearings 115, 116. The bearings 115, 116 are disposed about a first and second trunnion 118, 120, respectively, on opposing portions of the differential case 112. Various types of bearings may be employed for each of the bearings 115, 116 such as a roller bearing, a tapered roller bearing, a ball bearing, a needle bearing, and the like, for example. In an embodiment, the differential case 112 may be produced via the process of flow forming a metallic material such as, but not limited to, steel, premium carbon steel, aluminum, and aluminum alloys.

With reference to FIG. 2, a first pinion shaft 122 is disposed in the differential case 112. In an embodiment, the first pinion shaft 122 extends through the differential case 112 and is coupled at its ends in two opposing apertures 124, 126 formed through the differential case 112. First and second pinion gears 127, 128, are mounted on each end of the first pinion shaft 122, respectively. In certain embodiment, a second pinion shaft (not depicted) extends into the differential case 112 transverse the first pinion shaft 122 and is coupled at its ends with the differential case 112. Third and fourth pinion gears (not depicted) may be rotatably supported on the ends of the second pinion shaft. In other embodiments, not shown, the pinion gears (not depicted) are supported by a unitary cross pin.

The pinion gears 127, 128, (not depicted) may be meshed with a first side gear 132 and a second side gear 134 within the differential case 112. The side gears 132, 134 shown include radially inward projecting splines 136, 138, respectively, to engage axle half shafts or link shafts. In an embodiment, the side gear 132 is in splined engagement with a first axle half shaft 140 and the side gear 134 is in splined engagement with a link shaft 142. It should be appreciated that the side gears 132, 134 may be engaged with the first axle half shaft 140 and the link shaft 142, respectively, by any suitable method as desired such as a press fit, for example. The differential case 112 may include openings 144, 146 formed through the trunnions 118, 120 of the differential case 112 to accommodate the first axle half shaft 140 and the link shaft 142 coupled with the side gears 132, 134. As illustrated, the first axle half shaft 140 and a first end 141 of the link shaft 142 are inserted into and through the openings 144, 146 and into the side gears 132, 134 where radially outward projecting splines 148, 150 formed on the shafts 140, 142 engage the splines 136, 138 of the side gears 132, 134, respectively. In an embodiment, the shafts 140, 142 are secured in their position in the axle assembly 100 by respective c-clips 152, 154 inserted into grooves formed in the shafts 140, 142.

In the embodiment shown, the link shaft 142 includes at least one fluid passageway 155 formed therethrough. The at least one fluid passageway 155 is formed as part of a fluid flow system 153. In certain embodiments, the at least one fluid passageway 155 is configured to permit a flow of a fluid (e.g. a lubricant) from a fluid source 156 (e.g. a fluid sump of the axle assembly 100) to other locations within the carrier housing 102 to provide lubrication to various components disposed within the carrier housing 102 of the axle assembly 100. As a non-limiting example, the at least one fluid passageway 155 is configured to permit the flow of the fluid from the fluid source 156 to within an inner cavity 168 formed in the link shaft 142 of the disconnect assembly 111 and a bearing 170 disposed within the inner cavity 168 and interposed between an inner surface of the link shaft 142 and an outer surface of a second axle half shaft 160. Various types of bearings may be employed for the bearing 170 such as a roller bearing, a tapered roller bearing, a ball bearing, a needle bearing, and the like, for example.

As illustrated, the link shaft 142 includes a pair of the fluid passageways 155 circumferentially spaced equidistant from each other. Each of the fluid passageways 155 shown has a substantially constant inner diameter. It is understood, however, that each of the fluid passageways 155 may be tapered, wherein the inner diameter of each of the fluid passageways 155 gradually increases from an end thereof adjacent the fluid source to an end thereof adjacent the inner cavity 168 of the link shaft 142. The gradually tapered fluid passageways 155 direct the fluid towards the bearing 170. It is further understood that the fluid passageways 155 of the link shaft 142 may have any number, size, shape, and configuration as desired to provide a desired flow rate of the fluid from the fluid source 156 to the disconnect assembly 111.

As illustrated in FIG. 2, the link shaft 142 may also include an inner portion 171 formed adjacent the at least one fluid passageway 155 which is configured to further direct the fluid from the fluid source 156 towards the bearing 170 and militate against a substantial pooling of the fluid within the inner cavity 168. In one embodiment, the inner portion 171 is formed with a substantially 90° angle defining a shoulder thereof. It is understood, however, that the inner portion 171 may have any suitable shape and configuration as desired such as an inwardly tapered configuration to direct the fluid towards an inner portion of the bearing 170 or an outwardly tapered configuration to direct the fluid towards an outer portion of the bearing 170, for example.

A fluid flow member 157 of the fluid flow system 153 is disposed about the link shaft 142 and rotatable therewith. Various embodiments of the fluid flow member are shown in FIGS. 3A-3C, 4A-4C, 5A-5C, and 6A-6C. In certain embodiments shown in FIGS. 3A-3C, 4A-4C, 5A-5C, the fluid flow member 157 is formed by a main body 158 having a generally elliptical shape. In other embodiments shown in FIGS. 6A-6C, the main body 158 of the fluid flow member 157 may have a generally disc shape. The main body 158 includes a substantially planar first surface 173 and a substantially planar opposing second surface 175. A plurality of retention features 177 may be disposed on the first surface 173 of the main body 158. Each of the retention features 177 may include a protuberance 179 configured to cooperate with a corresponding feature (i.e. an annular groove) provided with the link shaft 142 to securely maintain a position of the fluid flow member 157 on the link shaft 142. The retention features 177 may be equidistantly spaced apart around circumference of a central bore 165 formed in the main body 158. As non-limiting embodiments shown in FIGS. 3A-3C and 5A-5C, the fluid flow member 157 may include any number, shape, size, and configuration of the retention features 177 as desired.

As illustrated, the main body 158 may also include at least one first surface feature 161 for directing the flow of the fluid obtained from the fluid source 156 into at least one catch 159. In a non-limiting example, the first surface feature 161 may be generally arcuate shaped or generally involute shaped, substantially corresponding to an outer peripheral edge of the main body 158. In certain other embodiments, the main body 158 may further include at least one second surface feature 163 formed thereon. It should be appreciated that each of the main body 158, the retention features 177, and the surface features 161, 163 may be formed from any suitable material such as a metal, a non-metal material (i.e. a plastic), or any combination thereof, for example. In a non-limiting example, the second surface feature 163 may be generally circular shaped to substantially surround the central bore 165 formed in the main body 158. As shown, the surface features 161, 163 may be connected if desired. In certain embodiments, a face of at least one of the surface features 161, 163 abuts a substantially planar face 181 of the link shaft 142 to cause the fluid to flow therebetween.

An end portion 167 of the first surface feature 161 opposite the at least one catch 159 is configured to first rotate into the fluid source 156, when the fluid flow member 157 is rotated in a first direction, to collect and direct or funnel the fluid on the main body 158 to the disconnect assembly 111. In other embodiments, the first surface features 161 may be formed on the second surface 175 so the end portions 167 are formed in alternating configurations so that when the fluid flow member 157 is rotated in either the first direction or an opposite second direction, the fluid flow member 157 collects and directs or funnels the fluid on the main body 158 to the disconnect assembly 111.

In certain embodiments, the at least one fluid catch 159 may be formed on the second surface 175 of the main body 158 of the fluid flow member 157. The at least one catch 159 is substantially aligned with the fluid passageways 155 formed in the link shaft 142 to permit fluid communication between the fluid source 156 and the fluid passageways 155. At least a portion of each of the catches 159 may extend into the fluid passageway 155 to militate against a flow of the fluid across the second surface 175 of the main body 158 and direct or funnel the flow of the fluid through the fluid passageway 155 into the disconnect assembly 111. In certain embodiments, at least one of the catches 159 includes a protuberance (not depicted) extending radially outwardly therefrom to cooperate with an inner surface of the cavity 168 to maintain the position of the fluid flow member 157.

It is understood that the fluid flow member 157 may have any shape, size, and configuration of the main body 158, any shape, size, number, and configuration of the at least one catch 159, and any shape, size, number, and configuration of the first and second surface features 161, 163 as desired to provide the desired flow rate of the fluid from the fluid source 156 to the disconnect assembly 111.

It is further understood that the fluid flow member 157 may also include at least one of the first and second surface features 161, 163 and the catch 159 formed on the first surface 173 thereof to provide lubrication to other various desired locations or components within the carrier housing 102. It should be appreciated that when the axle assembly 100 is configured so that the first surface 173 abuts a surface similar to the face 181 of the link shaft 42, the first and second surface features 161, 163 and the catch 159 of the fluid flow member 157 collect and direct or funnel the fluid on the main body 158 to at least one of a desired location or component as described above. On the contrary, when the axle assembly 100 is configured so that the first surface 173 of the fluid flow member 157 is open, the first and second surface features 161, 163 and the catch 159 perform as a fluid dispersing device (i.e. a fluid slinger) sporadically disseminating the fluid throughout the carrier housing 102 and not to a certain desired location.

Figure 3C:
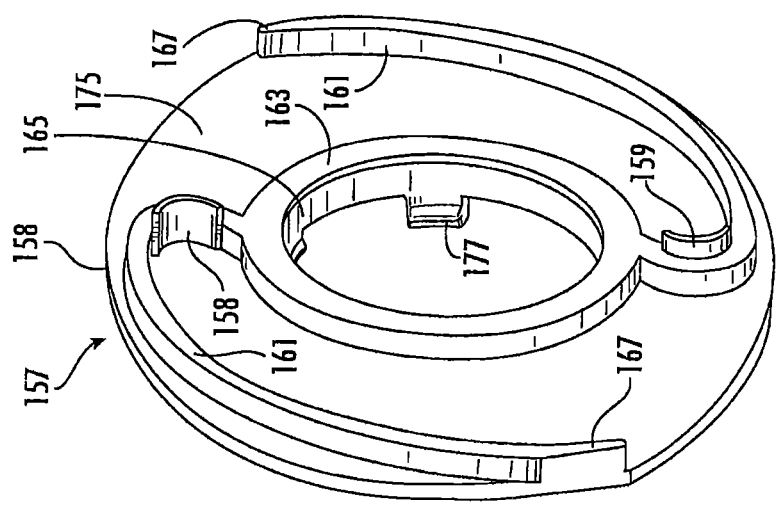
FIG. 3C is a rear perspective view the fluid flow member of FIGS. 3A-3B.
Figure 3B:
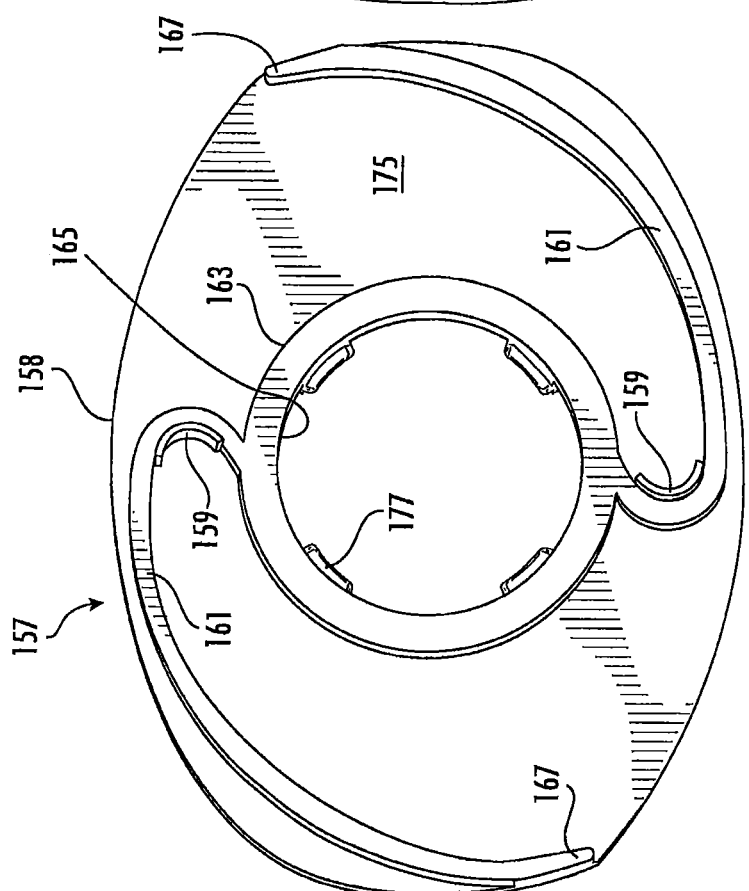
FIG. 3B is a rear elevational view of the fluid flow member of FIG. 3A.
Figure 3A:
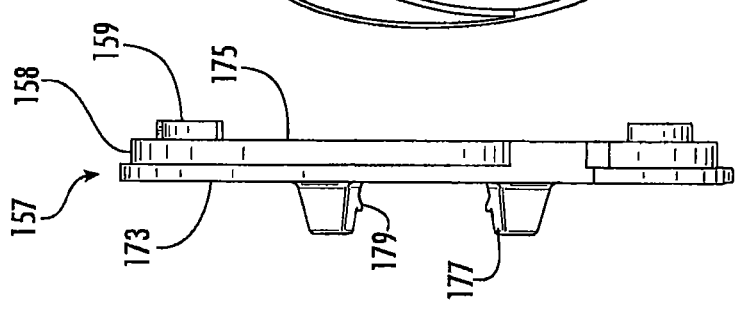
FIG. 3A is a side elevational view of the fluid flow member shown in FIG. 2 according to an embodiment of the presently disclosed subject matter.
Figure 4C:
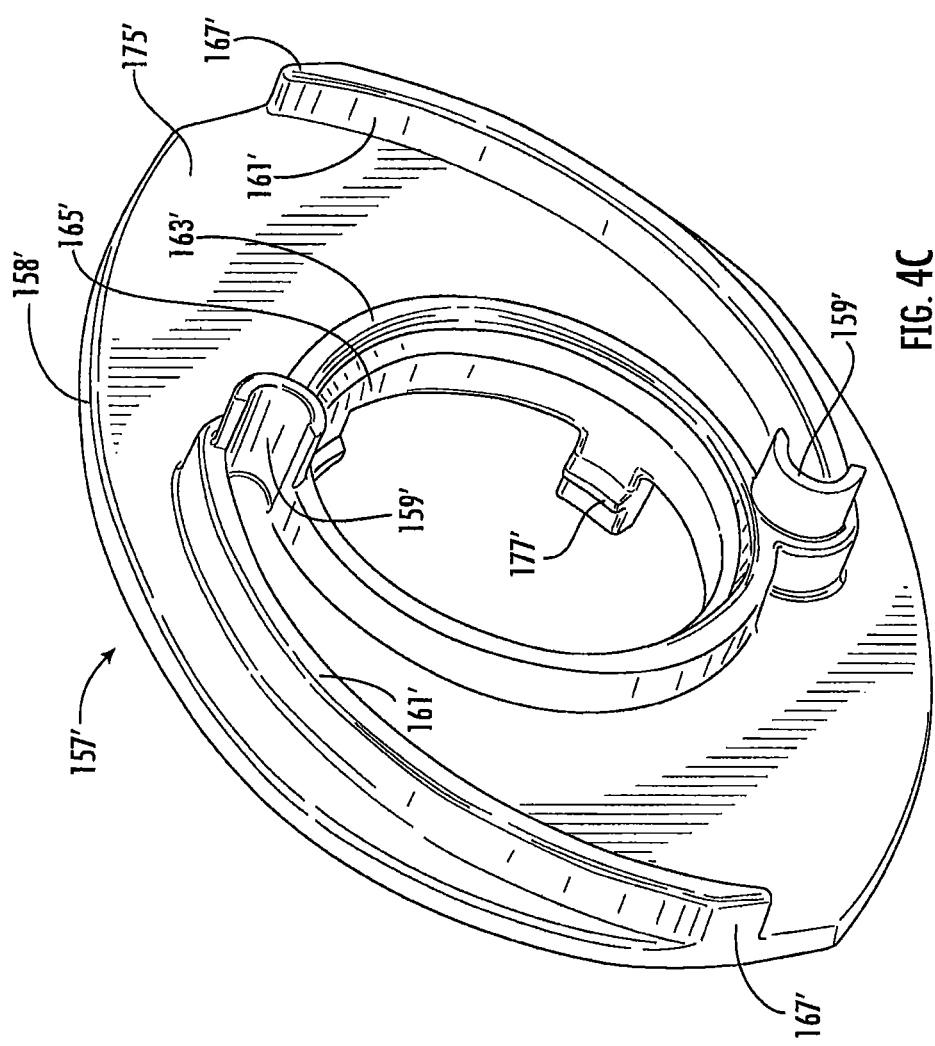
FIG. 4C is a rear perspective view the fluid flow member of FIGS. 4A-4B.

Another preferred embodiment of the fluid flow member 157' is depicted in FIGS. 4A-4C wherein the first surface features 161' are formed radially inwardly from the outer peripheral edge of the main body 158' towards the central bore 165'. The structure of the fluid flow member 157' which correspond to those of FIGS. 3A-3C are given the same reference numerals with a prime (') symbol. The manner of operation of fluid flow member 157' is the same as the fluid flow member 157.

Another preferred embodiment of the fluid flow member 157" is depicted in FIGS. 5A-5C wherein the first surface 173' of the main body 158' includes additional retention features 177' formed thereon. The structure of the fluid flow member 157" which correspond to those of FIGS. 3A-3C and 4A-4C are given the same reference numerals with a double prime (") symbol. The manner of operation of fluid flow member 157" is the same as the fluid flow members 157, 157'.

Yet another preferred embodiment of the fluid flow member 157''' is depicted in FIGS. 6A-6C wherein the main body 158''' is substantially disc shaped. The structure of the fluid flow member 157''' which correspond to those of FIGS. 3A-3C, 4A-4C, and 5A-5C, are given the same reference numerals with a triple prime (''') symbol. The manner of operation of fluid flow member 157''' is the same as the fluid flow members 157, 157', 157".

Figure 7C:
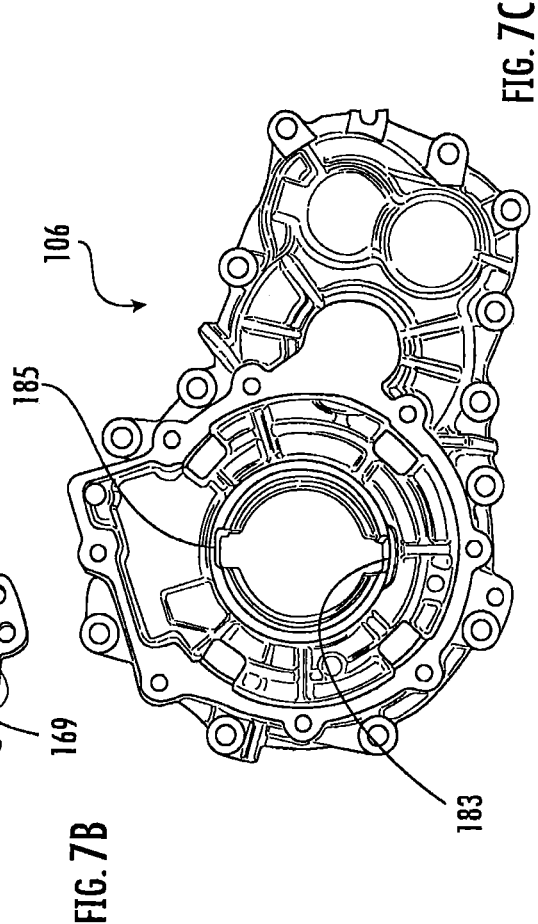
FIG. 7C is a rear elevational view of the housing portion of the axle assembly of 7B.
Figure 7B:
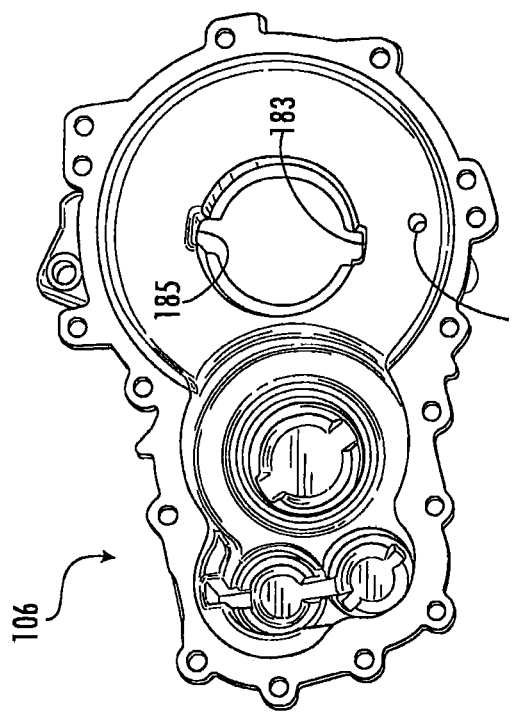
FIG. 7B is a front elevational view of the housing portion of the axle assembly of FIG. 7A.
Figure 7A:
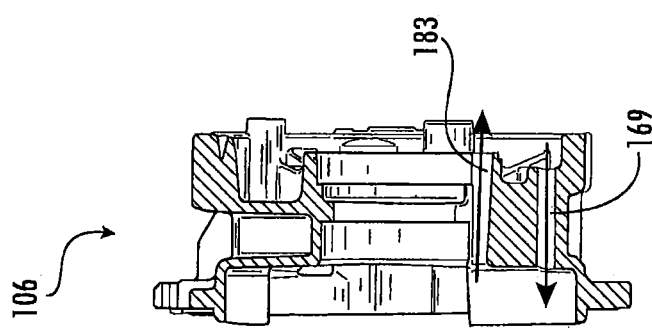
FIG. 7A is a side elevational view of a housing portion of the axle assembly shown in FIG. 2 according to an embodiment of the presently disclosed subject matter.

Referring now to FIGS. 7A-7C, the second housing portion 106 of the carrier housing 102 may include at least one fluid passageway 169 formed therethrough, which also forms part of the fluid flow system 153. In certain embodiments, the fluid passageways 169 is formed in a lower region of the second housing portion 106 to perform as a fluid return and permit the flow of the fluid from the disconnect assembly 111 back to the fluid source 158. It is understood that the fluid passageways 169 of the second housing portion 106 may have any number, size, shape, and configuration as desired to provide a desired flow rate of the fluid from the disconnect assembly 111 to the fluid source 156.

As more clearly shown in FIGS. 7B and 7C, the second housing portion 106 may further include a first fluid channel 183 and a second fluid channel 185 formed therein, which also form part of the fluid flow system 153. In certain embodiments, the fluid channels 183, 185 are formed in the second housing portion 106 radially outward from the outer peripheral edge of the main body 158 of the fluid flow member 157. Accordingly, each of the fluid channels 183, 185 permit additional amount of the fluid to flow from the fluid source 156 to the disconnect assembly 111. It is understood that the fluid channels 183, 185 may have any number, size, shape, and configuration as desired to provide a desired flow rate of the fluid from the fluid source 156 to the disconnect assembly 111. Further, the second fluid channel 185 may further perform as a fluid catch to cause at least a portion of the fluid collected by the fluid flow member 157 but not distributed through the fluid passageways 155 to be recollected by the surface features 161, 163 and directed into the catches 159 for distributing the fluid through the fluid passageway 155 into the disconnect assembly 111.

Referring back to FIG. 2 illustrates the disconnect assembly 111 according to an embodiment of the present disclosure. The disconnect assembly 111 shown is configured to connect and disconnect components (e.g. axle half shafts or link shafts) in the vehicle 10. In a non-limiting example, the disconnect assembly 111 connects and disconnects the link shaft 142 from the second axle half shaft 160. It should be appreciated, however, that the disconnect assembly 111 may be employed to connect and disconnect components of any suitable application as desired. In the embodiment shown, the link shaft 142 is mounted for rotation within the second housing portion 106 via a bearing 162 disposed about a second end 164 thereof. Similarly, the second axle half shaft 160 is mounted for rotation within the third housing portion 108 via a bearing 166 disposed about a first end 186 thereof. Various types of bearings may be employed for each of the bearings 162, 166 such as a roller bearing, a tapered roller bearing, a ball bearing, a needle bearing, and the like, for example.

As illustrated, the second end 164 of the link shaft 142 is disposed about the first end 186 of the second axle half shaft 160, which is received in the inner cavity 168 formed therein. In certain embodiments, the link shaft 142 and the second axle half shaft 160 rotate relative to each other. In a non-limiting example, the shafts 142, 160 rotate relative to each other via the bearing 170 disposed therebetween. Various types of bearings may be employed for the bearing 170 such as a roller bearing, a tapered roller bearing, a ball bearing, a needle bearing, and the like, for example.

The second end 164 of the link shaft 142 shown has a generally cylindrical shape and includes a radially outer surface 172. In certain embodiments, the radially outer surface 172 includes a plurality of splines 174 formed thereon. The link shaft 142 may receive a clutch member 176 of the disconnect assembly 111 thereon. Likewise, the first end 186 of the second axle half shaft 160 shown has a generally cylindrical shape and includes a radially outer surface 178. In certain embodiments, the radially outer surface 178 includes a plurality of splines 180 formed thereon. The second axle half shaft 160 may receive the clutch member 176 of the disconnect assembly 111 thereon. In certain embodiments, the disconnect assembly 111 includes the clutch member 176 rotatably coupled to one of link shaft 142 and the second axle half shaft 160 and selectively coupled to a remaining one of the link shaft 142 and the second axle half shaft 160 by any suitable method as desired.

The disconnect assembly 111 illustrated includes the clutch member 176 and the splined ends 164, 186 of the respective shafts 142, 160. The clutch member 176 shown has a generally cylindrical shape and includes a radially inner surface 182. In certain embodiments, the radially inner surface 182 includes a plurality of splines 184 formed thereon. The clutch member 176 may receive therein and be in splined engagement with the second end 164 of the link shaft 142. Various other suitable methods of engagement may be employed to engage the clutch member and the second end 164 of the link shaft 142 such as a press fit, for example. In certain embodiments, the clutch member 176 is axially movable and rotatably fixed to the link shaft 142. The clutch member 172 may also removably receive therein and be in selective splined engagement with the first end 186 of the second axle half shaft 160. In certain embodiments, the clutch member 176 is axially movable and selectively rotatably fixed to the second axle half shaft 160. It should be appreciated that other suitable methods of selective engagement may be employed between the clutch member 172 and the first end 186 of the second axle half shaft 160 if desired.

The disconnect assembly 111 may further include an actuator assembly 190. As a non-limiting example, the actuator assembly 190 may be an electromagnetic solenoid. It is understood, however, that various other types of actuator assemblies may be employed such as a mechanical, an electro-mechanical, pneumatic, or hydraulic actuator assembly, if desired. The actuator, assembly 190 may be mounted on the carrier housing 102 of the axle assembly 100. In certain embodiments, the actuator assembly 190 may be coupled with the third housing portion 108 such that the actuator assembly 100 is fixed against rotation relative to the carrier housing 102. Referring now to FIG. 2, the actuator assembly 190 includes a housing 192. An actuator component 196 such as an electromagnetic coil, for example, is disposed within the housing 192. The actuator component 196 is in electrical communication with a power source (not depicted), such as, but not limited to, a battery. The actuator component 196 may also be in communication with a controller (not depicted). In an embodiment, the controller may be mounted to an inboard surface or an outboard surface of the carrier housing 102. The electric motor-generator 101 may be in electrical communication with the controller. The controller may determine an operation of the electric motor-generator 101 and a state (e.g. engaged and disengaged) of the disconnect assembly 111.

A generally hollow-cylindrical armature 198 is disposed in the housing 192, radially between the actuator component 196 and an inner portion of the third housing portion 108. In an embodiment, the armature 198 does not rotate relative to the carrier housing 102. The armature 198 comprises a ferromagnetic material. It should be appreciated that the actuator assembly 190 may be designed with an additional spacer and pressure plate, if desired.

In an embodiment, the armature 198 is coupled with the clutch member 176. In one embodiment, the armature 198 may be coupled with the clutch member 176, such that they move axially as a single unit. The armature 198 and the clutch member 176 may be coupled together via a snap-fit connection, for example. In the embodiment shown, the clutch member 176 includes a radially extending flange 199 received into the armature 198. Coupling the armature 198 and the clutch member 176 prevents the armature 198 from being vibrated into a disengaged position while the clutch member 176 remains in an engaged position.

A biasing member 200 is disposed at least partially about the armature 198 and axially adjacent the housing 192 and the armature 198. In an embodiment, the biasing member 200 is disposed axially between the housing 192 and a retention element 202 (i.e. a snap ring) which is received in a groove located in an outer surface of the armature 198. The biasing member 200 may be, but is not limited to, one or more springs, one or more wave springs, or one or more Bellville-type washers.

As shown in FIG. 1, the disconnect assembly 111 of the axle assembly 100 is typically in a default disengaged position with the clutch member 176 in a first position. To engage the disconnect assembly 111, a signal from the controller causes electricity, which may also be referred to herein as an excitation voltage, to be supplied to the actuator component 196. The energized actuator component 196 generates a magnetic flux. The magnetic flux of the actuator component 196 causes the armature 198 to move in a first axial direction and urge the clutch member 176 in the first axial direction from the first position to a second position and into engagement with the second axle half shaft 160, thereby compressing the biasing member 200. In the embodiment shown, when the clutch member 176 is engaged with the second axle half shaft 160, a desired torque is transferred between the link shaft 142 to the second axle half shaft 160, and to the wheels of the vehicle 10.

To return the clutch member 176 to the first position, and urge the clutch member 176 in a second axial direction from the second position back to the first position and into disengagement with the second axle half shaft 160, the controller causes the supply of electricity to the actuator component 196 to be interrupted or reduced. The termination or reduction in the energization of the actuator component 196 enables the biasing member 200 to urge the clutch member 176 in the second axial direction and disengage the second axle half shaft 160, which thereby disconnects the torque transfer between the link shaft 142 and the second axle half shaft 160. When the actuator component 196 is energized, the clutch member 176 may not immediately engage the second axle half shaft 160. This time delay may lead to an uncertainty regarding the locked/un-locked state of the disconnect assembly 160. To determine the axial position of the clutch member 176, and therefore the locked/un-locked state of the disconnect assembly 111, a sensor (not depicted) may be utilized. Various types of sensors may be utilized for the sensor such as an eddy current sensor, for example.

During operation of the vehicle 10, the electric motor-generator 101 generates a torque which is transferred from an output shaft thereof through the at least one gear assembly to the differential 110 via the ring gear 114. The differential 110 in turn transfers a desired torque to the first axle half shaft 140 and the link shaft 142 causing a rotational movement thereof. When the disconnect assembly 111 is engaged, the torque is further transferred from the link shaft 142 to the second axle half shaft 160 causing a rotational movement thereof. On the contrary, when the disconnect assembly 111 is disengaged, the torque is not transferred from the link shaft 142 to the second axle half shaft 160. However, the rotational movement of the first axle half shaft 140 and the link shaft 142 is continued. Accordingly, the desired flow rate of the fluid from fluid source 156 through the fluid flow system 153 is essential for proper operation of the axle assembly 100 as well as to militate against undesired friction and wear of the components therewithin.

Since the rotational movement of the link shaft 142 occurs during the operation of the vehicle 10, when the disconnect assembly 111 is both engaged and disengaged, the fluid flow member 157 coupled to the link shaft 142 is also caused to rotate therewith. As the fluid flow member 157 is rotated, at least one of the surface features 161, 163 is rotated through the fluid disposed in the fluid source 156 of the carrier housing 102. As the fluid flow member 157 continues to rotate, the surface features 161, 163 and centrifugal force acting on the fluid, then cause the collected fluid to flow and funnel into the catches 159 and through the fluid passageways 155 of the link shaft 142. Once the fluid flows through the fluid passageways 155, a centrifugal force caused by the rotational movement of the link shaft 142 causes the fluid to flow into the cavity 168 and in and around the bearing 170 disposed therein to provide lubrication thereto. Thereafter, the fluid begins to flow to the lower portion of the carrier housing 102 due to a decrease in the centrifugal force and an increase in a gravitational effect on the fluid flow. As the fluid flows to the lower portion of the carrier housing 102, it flows through the fluid passageway 169 formed in the second housing portion 106 and back to the fluid source to be redistributed throughout the carrier housing 102 or recollected by the fluid flow member 157. Additionally, the fluid channel 183 further facilitates the flow of fluid from the fluid source 156 to the disconnect assembly 111.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
a housing having a fluid sump provided with a fluid disposed therein; and
a first fluid passageway arranged in a link shaft and configured to permit fluid flow between the fluid sump and a fluid flow member;
wherein the fluid flow member is rotatably disposed in the housing axially between a ring gear rotationally coupled to the link shaft and a disconnect assembly and is configured to at least partially direct a flow of the fluid to at least one desired component disposed within the housing
the fluid flow member includes a main body having a first surface and an opposing second surface, at least one retention feature extending from the first surface and at least one catch extending from the second surface, the at least one catch axially aligned with the first fluid passageway.

2. The axle assembly of claim 1, wherein the fluid flow member is one of disc shaped, elliptical shaped, and irregular shaped.

3. The axle assembly of claim 1, wherein the at least one retention feature includes a protuberance extending radially therefrom.

4. The axle assembly of claim 1, wherein at least one of the first surface and the opposing second surface of the main body is substantially planar.

5. The axle assembly of claim 1, wherein the at least one retention feature includes a plurality of retention features.

6. The axle assembly of claim 1, wherein the fluid flow member includes at least one surface feature formed on at least one of the first surface and the opposing second surface of the main body.

7. The axle assembly of claim 6, wherein the at least one surface feature is one of an arcuate shape and an involute shape.

8. The axle assembly of claim 6, wherein the at least one catch is formed at an end of the at least one surface feature.

9. The axle assembly of claim 1, wherein the ring gear at least partially surrounds a first side gear of a differential.

10. The axle assembly of claim 9, wherein the differential includes a pinion gear that is meshed with the first side gear and a second side gear and wherein the second side gear is rotationally attached to an axle shaft.

11. The axle assembly of claim 1, wherein the at least one desired component is a portion of the disconnect assembly and wherein a second fluid passageway extends between the fluid flow member and the disconnect assembly to allow fluid flow therebetween.

12. The axle assembly of claim 1, wherein the at least one desired component is a bearing interposed between the link shaft and an axle half shaft.

13. The axle assembly of claim 1, wherein the fluid flow member forms part of a fluid flow system.

14. The axle assembly of claim 13, wherein the link shaft rotationally connects a side gear to an axle shaft.

15. The axle assembly of claim 1, wherein the link shaft is rotationally connected to a first side gear in a differential and wherein the differential includes a second side gear to an axle shaft.

16. The axle assembly of claim 15, further comprising an electric motor-generator drivingly coupled to the ring gear of the differential.

17. The axle assembly of claim 1, wherein the at least one catch is disposed adjacent to a central bore.

18. The axle assembly of claim 1, further comprising a clutch member rotatably fixed to the link shaft and selectively rotatably fixed to an axle shaft.

19. An axle assembly, comprising:
a housing having a first axle shaft and a second axle shaft connected by a differential and a link shaft, wherein a bearing is interposed between the second axle shaft and the link shaft;
a disconnect assembly including a clutch member configured to selectively couple the second axle shaft and the link shaft; and
a fluid flow system including:
a fluid sump;
a first fluid passageway arranged in the link shaft and configured to permit fluid flow between the fluid sump and a fluid flow member, wherein the fluid flow member is rotationally disposed in the housing axially between a ring gear rotationally coupled to the link shaft and the disconnect assembly; and
the fluid flow member includes a main body having a first surface and an opposing second surface, at least one retention feature extending from the first surface and at least one catch extending from the second surface, the at least one catch axially aligned with the first fluid passageway.

20. A method of lubrication for an axle assembly, comprising:
providing a housing having a fluid sump and a fluid flow member rotatably disposed in the housing; and
causing a rotational movement of the fluid flow member to:
collect a portion of the fluid from the fluid sump through a fluid passageway arranged in a link shaft; and
at least partially direct a flow of the fluid to a disconnect assembly disposed within the housing from the fluid flow member that is axially arranged between a ring gear rotationally coupled to the link shaft and the disconnect assembly
the fluid flow member includes a main body having a first surface and an opposing second surface, at least one retention feature extending from the first surface and at least one catch extending from the second surface, the at least one catch axially aligned with the first fluid passageway.

* * * * *